(12) United States Patent
Puckett et al.

(10) Patent No.: US 12,169,349 B2
(45) Date of Patent: Dec. 17, 2024

(54) SYSTEMS, DEVICES, AND METHODS FOR OPTICAL FREQUENCY COMBS

(71) Applicant: Honeywell International Inc., Charlotte, NC (US)

(72) Inventors: Matthew Puckett, Phoenix, AZ (US); Chad Hoyt, Plymouth, MN (US); Jianfeng Wu, Phoenix, AZ (US); Karl Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/540,702

(22) Filed: Dec. 14, 2023

(65) Prior Publication Data

US 2024/0126136 A1  Apr. 18, 2024

Related U.S. Application Data

(62) Division of application No. 17/814,678, filed on Jul. 25, 2022, now Pat. No. 11,906,875.

(51) Int. Cl.
    *G02F 1/35* (2006.01)
(52) U.S. Cl.
    CPC .......... *G02F 1/353* (2013.01); *G02F 2203/15* (2013.01); *G02F 2203/56* (2013.01)
(58) Field of Classification Search
    CPC .............................. G02F 1/353; G02F 2203/56
    See application file for complete search history.

(56) References Cited

U.S. PATENT DOCUMENTS

| 6,493,091 | B2 * | 12/2002 | Kourogi | G01N 21/4795 356/489 |
| 7,587,144 | B2 | 9/2009 | Ilchenko et al. | |
| 7,982,944 | B2 | 7/2011 | Kippenberg et al. | |

(Continued)

FOREIGN PATENT DOCUMENTS

| CN | 110554465 A | | 12/2019 |
| CN | 113964639 A | * | 1/2022 |

(Continued)

OTHER PUBLICATIONS

English Translation of CN 113964639 A, 17 pages. (Year: 2021).*

(Continued)

*Primary Examiner* — Daniel Petkovsek
(74) *Attorney, Agent, or Firm* — Alston & Bird LLP (57) ABSTRACT

A method may comprise: generating an optical frequency comb; applying a filter in a first configuration to the generated optical frequency comb to select a first frequency of the optical frequency comb, wherein, in the first configuration, the first frequency aligns with a first pass-band of the filter, and a second frequency of the optical frequency comb does not align with a second pass-band of the filter; altering the filter to a second configuration to shift the first pass-band and the second pass-band to a shifted first pass-band and a shifted second pass-band; and applying the altered filter to the generated optical frequency comb to select the second frequency of the optical frequency comb, wherein the second frequency aligns with the shifted second pass-band of the filter, and the first frequency of the optical frequency comb does not align with the shifted first pass-band of the filter.

20 Claims, 4 Drawing Sheets

(56) References Cited

U.S. PATENT DOCUMENTS

| | | | |
|---|---|---|---|
| 9,490,605 | B2 | 11/2016 | Gaeta et al. |
| 9,647,408 | B2 | 5/2017 | Lowell |
| 9,891,500 | B1 | 2/2018 | Chu et al. |
| 10,498,453 | B2 | 12/2019 | Kuse et al. |
| 10,969,276 | B2 | 4/2021 | Kippenberg et al. |
| 11,175,563 | B2 | 11/2021 | Wong et al. |
| 11,429,010 | B1 | 8/2022 | Puckett et al. |
| 11,906,875 | B2 * | 2/2024 | Puckett .............. G02B 6/29341 |
| 2007/0009205 | A1 | 1/2007 | Maleki et al. |
| 2012/0105177 | A1 | 5/2012 | Mclaren et al. |
| 2015/0236467 | A1 * | 8/2015 | Schneider ............. H01S 3/0085 372/32 |
| 2019/0341739 | A1 | 11/2019 | Loh et al. |
| 2020/0319029 | A1 | 10/2020 | Smyth et al. |
| 2022/0026780 | A1 | 1/2022 | Gui et al. |
| 2022/0050356 | A1 | 2/2022 | Kippenberg et al. |
| 2022/0416498 | A1 | 12/2022 | Redding et al. |

FOREIGN PATENT DOCUMENTS

| | | | |
|---|---|---|---|
| WO | 2020/192887 | A1 | 10/2020 |
| WO | 2021/194630 | A2 | 9/2021 |

OTHER PUBLICATIONS

Ding et al., "Kerr frequency comb with varying FSR spacing based on Si3N4 micro-resonator," Nov. 30, 2020, http://scis.scichina.com/en/2020/212401.pdf [retrieved on Jul. 20, 2022]. Retrieved from the Internet (7 pages).

Extended European Search Report Mailed on Nov. 22, 2023 for EP Application No. 23184927, 9 page(s).

Geng et al., "Coherent optical communications using coherence-cloned Kerr soliton microcombs," Feb. 28, 2022, https://www.nature.com/articles/s41467-022-28712-y.pdf [retrieved on Jul. 20, 2022]. Retrieved from the Internet (8 pages).

Jung et al., "Optical Frequency Comb Generation from Aluminum Nitride Micro-Ring Resonator," Aug. 2013, https://www.researchgate.net/publication/254260039_Optical_Frequency_Comb_Generation_from_Aluminum_Nitride_Micro-Ring_Resonator [retrieved on Jul. 20, 2022]. Retrieved from the Internet (4 pages).

Liao et al., "Dual-comb generation from a single laser source: principles and spectroscopic applications towards mid-IR -A review," Sep. 22, 2020, https://iopscience.iop.org/article/10.1088/2515-7647/aba66e/pdf [retrieved on Jul. 20, 2022]. Retrieved from the Internet (17 pages).

Moille et al., "Tailoring Broadband Kerr Soliton Microcombs via Post-Fabrication Tuning of the Geometric Dispersion," Sep. 13, 2021, https://arxiv.org/pdf/2109.09473.pdf [retrieved on Jul. 20, 2022]. Retrieved from the Internet (7 pages).

Non-Final Rejection Mailed on Jun. 8, 2023 for U.S. Appl. No. 17/814,678, 12 page(s).

Notice of Allowance and Fees Due (PTOL-85) Mailed on Sep. 14, 2023 for U.S. Appl. No. 17/814,678, 9 page(s).

Requirement for Restriction/Election Mailed on Mar. 14, 2023 for U.S. Appl. No. 17/814,678, 9 page(s).

* cited by examiner

SYSTEMS, DEVICES, AND METHODS FOR OPTICAL FREQUENCY COMBS

CROSS-REFERENCE TO RELATED APPLICATIONS

This application is a divisional of U.S. Non-Provisional application Ser. No. 17/814,678, entitled "SYSTEMS, DEVICES, AND METHODS FOR OPTICAL FREQUENCY COMBS", filed on Jul. 25, 2022 and issued as U.S. Pat. No. 11,906,875 B2 on Feb. 20, 2024, which is incorporated herein by reference in its entirety.

TECHNICAL FIELD

Various embodiments of the present disclosure relate generally to the field of optical combs. In particular, the present disclosure relates to tunable filters for optical frequency combs and to optical comb generation utilizing resonators with modulated sidewalls.

BACKGROUND

Optical frequency combs have regularly spaced spectral lines of power. The power lines resemble the teeth of a comb, with each frequency separated into a distinct spike. Such combs are useful for various applications. For example, optical frequency combs may be utilized for timekeeping (e.g., atomic clocks), measuring distance, or measuring greenhouse gas emissions. Optical frequency combs also may be used to map optical frequencies into the radio frequency. Although optical frequency combs have a wide variety of present uses and contemplated future uses, challenges remain in utilizing and generating optical frequency combs. In particular, needs exist for tunable filters for optical frequency combs and for optical comb generators utilizing gratings optical comb generation utilizing resonators with modulated sidewalls.

SUMMARY OF THE DISCLOSURE

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

A method for an optical frequency comb may comprise: generating an optical frequency comb; applying a filter in a first configuration to the generated optical frequency comb to select a first frequency of the optical frequency comb, wherein, in the first configuration, the first frequency aligns with a first pass-band of the filter, and wherein, in the first configuration, a second frequency of the optical frequency comb does not align with a second pass-band of the filter; altering the filter to a second configuration to shift the first pass-band and the second pass-band to a shifted first pass-band and a shifted second pass-band; and applying the altered filter to the generated optical frequency comb to select the second frequency of the optical frequency comb, wherein, in the second configuration, the second frequency aligns with the shifted second pass-band of the filter, and wherein, in the second configuration, the first frequency of the optical frequency comb does not align with the shifted first pass-band of the filter.

Any of the exemplary methods, systems, or devices disclosed herein may include any of the following features or steps, additionally or alternatively, in any combination. Altering the filter may include heating the filter. The optical frequency comb may be a first optical frequency comb, and the filter may be a first filter, the method further comprising: generating a second optical frequency comb; applying a second filter in a first configuration to the second generated optical frequency comb to select a first frequency of the second optical frequency comb, wherein, in the first configuration, the first frequency of the second optical frequency comb aligns with a first pass-band of the second filter, and wherein, in the first configuration of the second filter, a second frequency of the second optical frequency comb does not align with a second pass-band of the second filter; altering the second filter to a second configuration of the second filter to shift the first pass-band of the second filter and the second pass-band of the second filter to a shifted first pass-band of the second filter and a shifted second pass-band of the second filter; and applying the altered second filter to the generated second optical frequency comb to select the second frequency of the second optical frequency comb, wherein, in the second configuration, the second frequency of the second optical frequency comb aligns with the shifted second pass-band of the second filter, and wherein, in the second configuration of the second filter, the first frequency of the second optical frequency comb does not align with the shifted first pass-band of the second filter. Each of the first pass-band of the first filter and the second pass-band of the first filter may have a higher frequency than the shifted first pass-band of the first filter and the shifted second pass-band of the first filter, respectively. Each of the first pass-band of the second filter and the second pass-band of the second filter may have a lower frequency than the shifted first pass-band of the second filter and the shifted second pass-band of the second filter, respectively. The method may further include: in the first configuration of the first filter and the first configuration of the second filter, generating a radio frequency using the first frequency of the first optical frequency comb and the first frequency of the second optical frequency comb. The method may further include, in the second configuration of the first filter and the second configuration of the second filter, generating a radio frequency using the second frequency of the first optical frequency comb and the second frequency of the second optical frequency comb. A free spectral range ("FSR") of the filter may be offset relative to a repetition rate of the optical frequency comb.

In a further example, a method for optical frequency combs may comprise: applying a first filter to a first optical frequency comb, wherein the first filter selects a first frequency of the first optical frequency comb; applying a second filter to a second optical frequency comb, wherein the first filter selects a second frequency of the second optical frequency comb; altering the first filter and the second filter; applying the altered first filter to the first optical frequency comb, wherein the filter selects a third frequency of the first optical frequency comb, wherein the third frequency differs from the first frequency; and applying the altered second filter to the second optical frequency comb, wherein the filter selects a fourth frequency of the second optical frequency comb, wherein the fourth frequency differs from the second frequency.

Any of the exemplary methods, systems, or devices disclosed herein may include any of the following features or steps, additionally or alternatively, in any combination. Altering the filter may include heating the filter. The third frequency may be lower than the first frequency, and the fourth frequency may be higher than the second frequency. The method may further comprise, before altering the filter, generating a radio frequency using the first frequency of the first optical frequency comb and the second frequency of the second optical frequency comb. The method may further comprise, after altering the filter, generating a radio frequency using the third frequency of the first optical frequency comb and the fourth frequency of the second optical frequency comb. A free spectral range ("FSR") of the first filter may be offset relative to a repetition rate of the first optical frequency comb.

In an example, a system for generating an optical frequency comb may comprise: a light source; and a resonator, wherein a surface of the resonator includes a periodic modulation, wherein the periodic modulation of the surface of the resonator is configured to interact with light from the light source.

Any of the exemplary methods, systems, or devices disclosed herein may include any of the following features or steps, additionally or alternatively, in any combination. The periodic modulation may include a Bragg grating. The periodic modulation may be configured to split the light from the light source. A resonance of the split resonance may be usable to generate an optical frequency comb without the use of an anomalous resonator. The light source may emit light having a wavelength that corresponds to a split resonance of the periodic modulation. The light source may produce a single-wavelength light.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of optical combs. In particular, the present disclosure relates to tunable filters for optical frequency combs and to optical comb generators utilizing gratings. Applications of optical frequency combs may include generating radio frequencies by beating lines of one or more optical frequency combs with one another on a photodetector. For such applications and others, it may be desirable to select two frequency lines, one from each of two optical frequency combs. The two selected frequency lines may be used to produce a single beat frequency. Other applications of optical frequency combs include gas sensing (e.g., spectral gas sensing). For example, a gas may be identified by which frequencies of light it absorbs.

According to aspects of the disclosure, one or more tunable filters may select a desired frequency of an optical frequency comb. A tunable filter may include a resonator (e.g., a ring resonator) and a source of heat for heating the resonator (e.g., a microheater). At a first temperature, the resonator may have one or more first pass-band frequencies/resonance(s) and may transmit one or more first lines of an optical frequency comb that align with the one or more first pass-band frequencies/resonance(s). At a second temperature, the resonator may have one or more second pass-band frequencies/resonance(s) and may transmit one or more second lines of the optical frequency comb that align with two or more second pass-band frequencies/resonance(s). Thus, at the first temperature, the resonator may transmit a first line (having a first frequency) of the optical frequency comb and, at a second temperature, the resonator may transmit a second line (having a second frequency) of the optical frequency comb. The second frequency may differ from the first frequency.

A system may include two such filters that act on two optical frequency combs. A first resonator may select a first line of a first optical frequency comb at a first temperature of the first resonator. A second resonator may select a second line of a second optical frequency comb at a first temperature of the second resonator. The first line of the first optical frequency comb and the second line of the second optical frequency comb may be used to produce a first beat signal. The first and second resonator may be tuned (e.g., by modulation of temperature), so that the first resonator selects a third line of the first optical frequency comb at a second temperature of the first resonator and the second resonator selects a fourth line of the second optical frequency comb at a second temperature of the second resonator. The third line of the first optical frequency comb and the fourth line of the second optical frequency comb may be used to produce a second beat signal. Thus, the system may facilitate selection of different frequency lines of one or more optical frequency combs. The frequency lines may be used to produce beat signals having various output radio frequencies.

It also may be desirable to generate optical frequency filters with filters with normal (as opposed to anomalous) dispersion. In additional or alternative aspects of the disclosure, a resonator may be utilized to produce an optical frequency comb. The resonator may include a periodic modulation of the waveguide sidewalls. The modulation may split a resonance frequency that satisfies the Bragg condition. Pump laser light may be injected into the resonator at a wavelength corresponding to the split resonance. As the frequency of the pump laser is scanned across the resonance frequency, the waveguide's non-linear coefficient couples light from the pump wavelength, across a span of wavelengths supported by the generated optical frequency comb.

Figure 1:
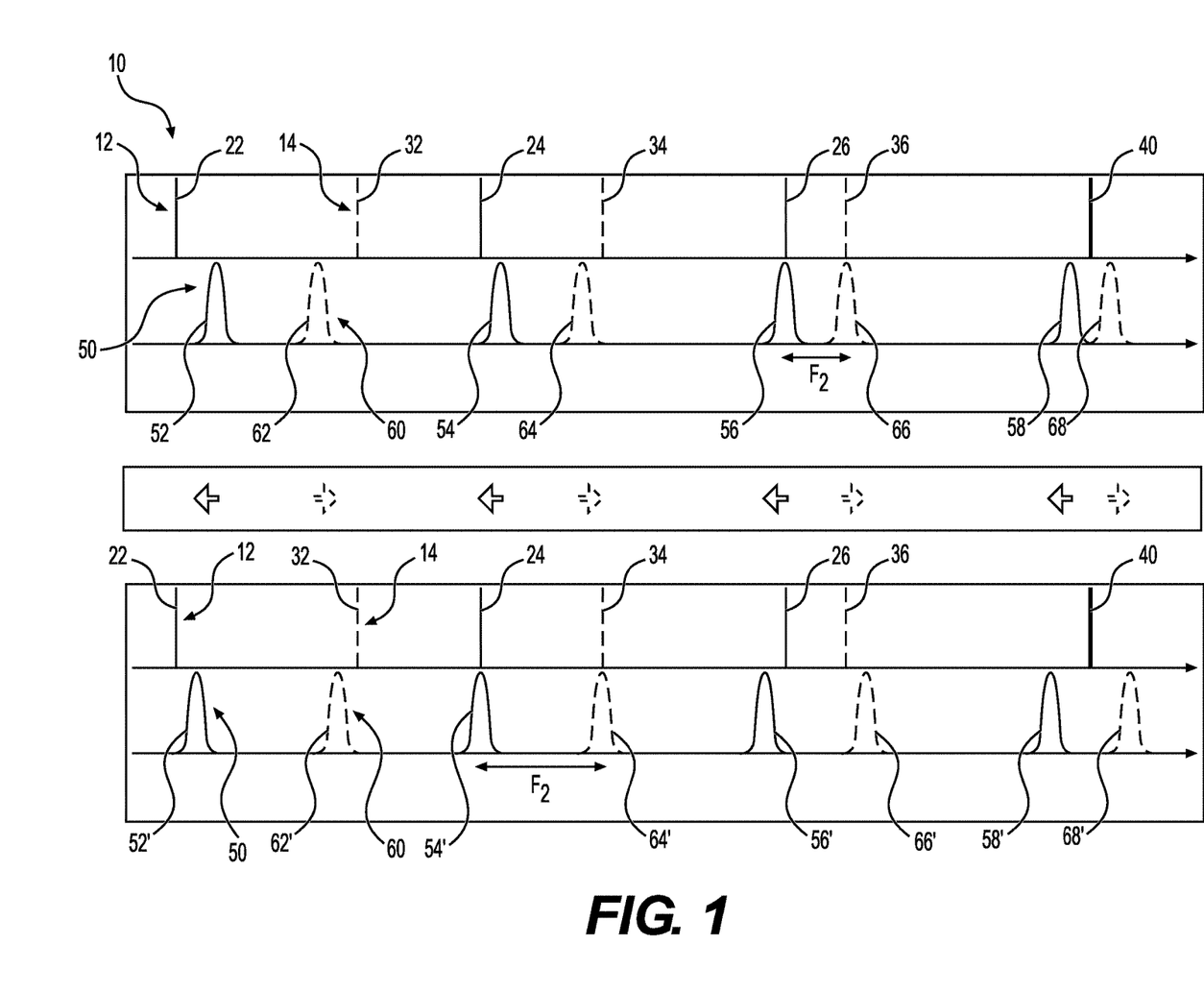
FIG. 1 depicts a schematic diagram of a process for filtering one or more optical comb(s).

FIG. 1 depicts a schematic diagram 10 of a process for filtering a first optical frequency comb 12 (referred to herein as "first comb 12," with comb lines shown in solid lines) and a second optical frequency comb 14 (referred to herein as "second comb 14," with comb lines shown in broken lines). First comb 12 and second comb 14 may be generated or utilized using any technique currently known in the art or that becomes known. First comb 12 may include a plurality of comb lines 22, 24, 26. Second comb 14 may include a plurality of comb lines 32, 34, 36. First comb 12 and second comb 14 may share locked comb lines 40 (shown as a bold line), in which combs 12, 14 have the same frequency.

Figure 2:
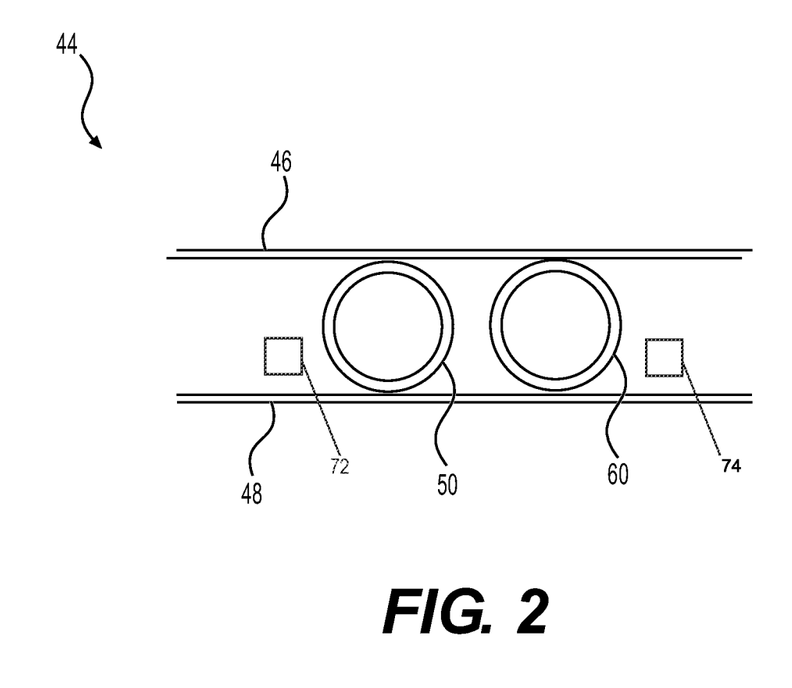
FIG. 2 depicts a system for filtering one or more optical comb(s) using the method of FIG. 1.

FIG. 2 depicts a system 44 that may be utilized to perform the process depicted in FIG. 1. An arrangement of elements of system 44 described herein is merely exemplary, and any suitable arrangement may be utilized. System 44 may include a first filter 50 (e.g., a resonator or other type of filter) and a second filter 60 (e.g., a resonator or other type of filter), which may act on light transmitted by waveguides 46 and/or 48. For example, first comb 12 and second comb 14 may be transmitted by waveguides 46 and/or 48. Each of first filter 50 and second filter 60 may include a ring resonator, as depicted in FIG. 2. However, first filter 50 and second filter 60 may include any suitable type of filter known in the art or to become known in the art. Each of first filter 50 and second filter 60 may have a periodic set of pass-band frequencies spaced by its respective free spectral range ("FSR"). As shown in FIG. 1, in a first configuration, first filter 50 may have first pass-band frequencies (e.g., resonances) 52, 54, 56, 58 (shown in solid lines), and second filter 60 may have second pass-band frequencies (e.g., resonances) 62, 64, 66, 68 (shown in broken lines).

First filter 50 may be associated with first comb 12. That is, first filter 50 may receive a signal associated with first comb 12. First filter 50 may transmit comb line(s) of first comb 12 that correspond to pass-band/resonance frequenc(ies) of first filter 50. For example, as shown in FIG. 1, pass-band 56 may align with comb line 26 in the first configuration or first filter 50. Comb lines 22, 24 (and locked line 40) may not align with a pass-band frequency of first filter 50 and thus may not be transmitted by first filter 50. Thus, first filter 50 may transmit only comb line 26 (which matches resonance 56), as shown in FIG. 1.

Second filter 60 may be associated with second comb 14. That is, second filter 60 may receive a signal associated with second comb 14. Second filter 60 may transmit comb line(s) of second comb 14 that correspond to resonance frequenc(ies) of second filter 60. For example, as shown in FIG. 1, pass-band 66 may correspond to comb line 36 in the first configuration or second filter 60. Comb lines 32, 34 (and locked line 40) may not match a pass-band frequency of second filter 60 and may not be transmitted by second filter 60. Thus, second filter 60 may transmit only comb line 36 (which matches resonance 66). In the first configuration, comb lines 26 (first comb 12) and 36 (second comb 14) may be separated by a first frequency $f_1$ (shown in FIG. 1). The two comb lines 26 and 36 may be used to produce a first beat frequency, which may have a value of first frequency $f_1$. The selected comb lines 26 and 36 may alternatively be used for other applications that are known or become known, including but not limited to those listed above. For example, comb lines 26 and 36 may be used for gas sensing. For example, amplitudes of comb lines 26 and 36 may be compared to determine a species of gas. Additionally or alternatively, amplitudes of the beat frequencies may be used to determine wavelength-dependent absorption/transmission, thereby determining a species of gas.

Filters 50, 60 may each be thermally tunable. In other words, pass-band frequencies of filters 50, 60 may be adjusted by changing a temperature of filters 50, 60. For example, respective heaters 72, 74 (each of which may include, for example, a microheater) may be used to adjust a temperature of filters 50, 60. Alternatively, filters 50, 60 may be tuned according to other techniques, known or to become known. Although separate heaters 72, 74 are shown for each filter 50, 60, the same heater may be used for both of filters 50, 60.

As shown in FIG. 1, a tuning effect 76 may, upon a change in temperature of filters 50, 60, shift the pass-band frequencies of filters 50, 60, in the directions shown by the arrows associated with each pass-band frequency. For example, pass-band frequencies 52, 54, 56, 58 in the first configuration of filter 50 may shift downward (to the left in FIG. 1) to pass-band frequencies 52', 54', 56', 58' in a second configuration of first filter 50. Pass-band frequencies 62, 64, 66, 68 in the first configuration of filter 60 may shift upward to pass-band frequencies 62', 64', 66', 68' in a second configuration of second filter 60. In the second configuration, pass-band frequency 54' of first filter 50 may align with line 24 of first comb 12. In the second configuration, pass-band frequency 64' of second filter 60 may align with line 34 of second comb 14. Because, in the second configuration, the other pass-band frequencies of filters 50, 60 may not align with lines of combs 12, 14, respectively, only lines 24 and 34 may be passed in the second configuration. Lines 24 and 34 may be separated by a second frequency $f_2$, which may be different from (e.g., larger than) first frequency $f_1$. The two comb lines 26 and 36 may be used to produce a second beat frequency (e.g., second frequency $f_2$), different from the first frequency. Alternatively, comb lines 26 and 36 may be utilized for any other application known or to become known, including gas sensing.

Thus, tuning of filters 50, 60 may allow selection of different lines of first comb 12 and second comb 14. The selected lines may be used to produce beat frequencies of different values. Although two different configurations are described above, it will be appreciated that other configurations of filters 50, 60 may be used to select still other lines of first comb 12 and second comb 14 to produce various beat frequencies.

The FSR of each of filters 50, 60 may be offset slightly relative to a repetition rate of the corresponding comb 12, 14. The offset between the FSR and the repetition rate of the comb may not be less than the full width at half maximum ("FWHM") of the resonance. Such a slight offset of the FSR may provide for a small thermal tuning range, allowing the required tuning range of filters 50, 60 to be drastically reduced as compared to moving a single resonance in order to sample different lines of the comb.

In an illustrative example, assume first comb 12 and second comb 14 exhibit respective repetition rates of 5.148 GHz and 5.334 GHz. Assuming a 2 MHz full-width at half-maximum ("FWHM") of filters 50, 60, the FSR of filter 50 may be set to be 30 MHz less than the repetition rate of first comb 12 (i.e., 5.148 GHz-30 MHz=5.118 GHz), and the FSR of filter 60 may be set to be 30 MHz greater than the repetition rate of second comb 14 (i.e., 5.334 GHz+30 MHz=5.364 GHz). The exemplary value of 30 MHz misalignment may be chosen because, for a resonance with a 2 MHz FWHM, 30 MHz is the frequency detuning that yields 40 dB of suppression in the transmitted power of neighboring comb lines. 40 dB of power suppression may be a target (i.e., required value) so as to reach a target value for spur height of −80 dBc/Hz.

Because the repetition rates of combs 12, 14 are less than 40 GHz (e.g., for a resonator with a length of approximately 40 mm), combs 12, 14 beat with each other approximately 8 times as comb lines are sampled farther away from the spectral position of the optical phase lock loop ("OPLL"), but that does not prevent the targeted frequency from being produced. Because the step size of the output frequency is 186 MHz, a number of line doublets required to reach an output frequency greater than 40 GHz is 216. As a result, the integrated walk-off between either comb line and its corresponding output filter resonance (i.e., difference between the comb line of comb 12 or 14 and its associated pass-band frequency of the associated filter 50 or 60 for the most widely separated doublet is (216)(30 MHz)=6.48 GHz. This is then the required thermal tuning range of each output filter, and by assuming a thermo-optic coefficient of $1\times10^{-5}$/° C. for silicon dioxide, we may calculate a required temperature range for the output filtering of only 6.65° C. It will be noted that the values above are merely exemplary. For example, resonators with different lengths may be utilized and/or a step size of the output frequency may be altered (increased or decreased) by changing a length of one (or more) of the resonators producing the combs.

As discussed above, filter 50 may be tuned in an opposite direction of filter 60 as the target output frequency (beat frequency produced by lines of the combs) changes. In other words, pass-band frequencies of filter 50 may decrease as filter 50 is tuned, while pass-band frequencies of filter 60 may increase as filter 60 is tuned. Accordingly, the FSR of filter 50 may be slightly smaller than the repetition rate of first comb 12 (as discussed in the example above), while the FSR of filter 60 may be slightly larger than the repetition rate of second comb 14 (as discussed in the example above).

Figure 3:
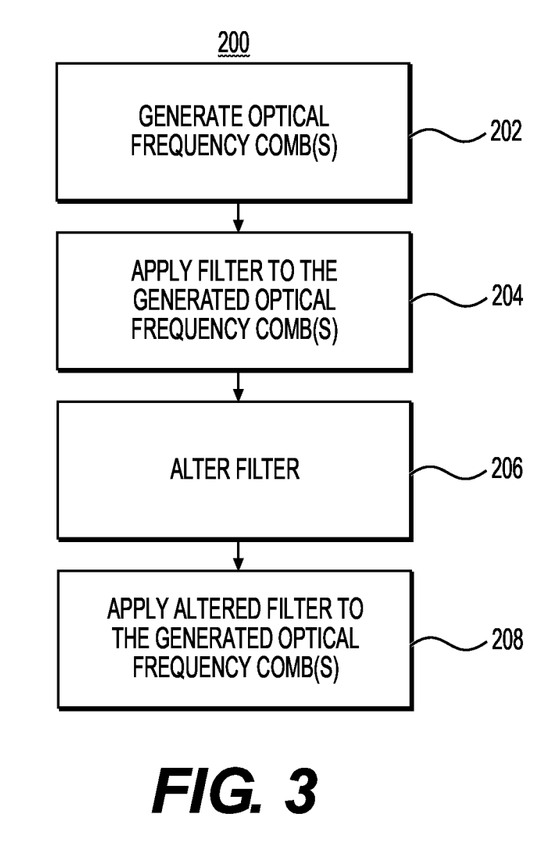
FIG. 3 is a flow diagram of steps of the method of FIG. 1.

FIG. 3 depicts an exemplary method 200 for selecting lines of optical frequency combs, such as first comb 12 and second comb 14. In step 202, at least one optical frequency comb may be generated. The optical frequency comb may be generated according to any of the techniques described here or any techniques that are known or become known in the art. The optical frequency comb may include a plurality of comb lines, having various frequencies.

In step 204, a filter may be applied to the optical frequency comb generated in step 204. For example, the filter may include a resonator, such as a ring resonator. The resonator may include a plurality of resonances (pass-band frequencies). When a resonance of the filter aligns with a line of the generated optical frequency comb, that line may be transmitted through the resonator (e.g., to a drop port, which may function as an output coupler). As discussed above, where a pair of optical frequency combs are generated, and a filter is applied to each of the pair of optical frequency combs, the transmitted frequency lines of each optical frequency comb may be used to produce a beat signal at an output of a radio frequency generating architecture. In other words, filters may select one or more frequency lines from each comb, and those selected lines may be used to produce a radio frequency.

In step 206, the filter (e.g., resonator) may be altered so as to have different pass-band frequencies (e.g., resonances). In other words, the filter may be tuned to have different pass-band frequencies/resonances. For example, the resonator may be heated or cooled to change resonances of the resonator. For example, where two optical frequency combs are generated in step 202, and two resonators are utilized, a first resonator's resonators may shift downward and a second resonator's resonances may shift upward.

In step 208, after the filter is altered, the filter may be applied to the at least one optical comb. It will be appreciated that step 202 may be repeated between steps 206 and 208 or step 202 may be continued throughout performance of the steps after step 202. In other words, the optical frequency comb(s) may be continuously generated. Alternatively, the optical frequency comb(s) may cease to be generated at certain points (e.g., before step 206) and step 202 may be repeated prior to performance of step 208. The filter(s) (e.g., resonator) may transmit line(s) of the optical frequency comb(s) according to the pass-band frequencies (e.g., resonances) of the tuned/altered filter. In other words, the filter(s) may pass line(s) of the optical frequency comb (s) that align with the pass-band frequencies/resonances of the tuned filter/resonator. The transmitted line(s) in step 208 may differ from the transmitted line(s) in step 204. For example, the first resonator described above as to step 206 may transmit line(s) of a first optical frequency comb that have a lower frequency than the line(s) transmitted in step 204. The second resonator described above as to step 206 ay transmit line(s) of a second optical frequency comb that have a higher frequency than the line(s) transmitted in step 204. As in step 202, where a pair of optical frequency combs are generated, and a filter is applied to each of the pair of optical frequency combs, the transmitted frequency lines of each optical frequency comb may be used to produce a beat signal at an output of a radio frequency generating architecture. In other words, filters may select one or more frequency lines from each comb, and those selected lines may be used to produce a radio frequency. The radio frequency produced in step 208 may differ from the radio frequency produced in step 104. For example, the radio frequency produced in step 208 may be larger than the radio frequency produced in step 204, because the selected lines of the optical frequency combs may be farther apart from one another (have a greater frequency difference).

In order to manufacture the filter(s), a ring resonator may be fabricated through established steps of lithography, etching, and/or cladding deposition. As discussed above, a FSR of the ring resonator may be chosen to be slightly offset from the repetition rate of the optical frequency comb to be filtered. A microheater or other similar structure may be fabricated atop the resonator (e.g., using lithography, metal deposition, and/or liftoff). The heater may be driven to control a position of the resonator's (filter's) resonances (pass-band frequencies).

Figure 4:
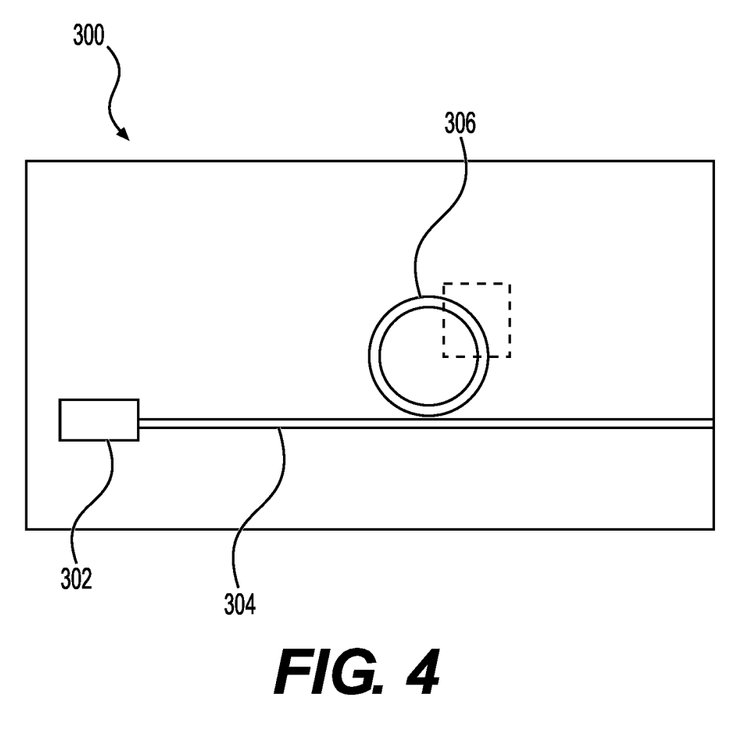
FIG. 4 depicts a system for generation of an optical comb.

FIG. 4 depicts an exemplary system 300 for generating an optical frequency comb. In the past, optical frequency combs have been generated by optical resonators exhibiting anomalous dispersion. Anomalous dispersion, which means that the index of refraction exhibits a negative second derivative with respect to wavelength, is typically very challenging to achieve and places strict requirements on the geometry of the waveguide comprising the resonator (e.g., sizes/shapes that are not desirable for assemblies). A waveguide having anomalous dispersion also may be challenging to fabricate or have a higher loss.

Recently, it has been shown theoretically that resonators with normal dispersion (the index of refraction has a positive second derivative with respect to wavelength), are capable of generating optical frequency combs if the resonance used to inject the pump light (which feeds optical power into the lines of the optical frequency comb through four-wave mixing) exhibits splitting. This mode-coupling-induced splitting typically only occurs at particular wavelengths, placing a limit on which optical frequencies can be used to generate the optical frequency comb.

System 300 may be utilized to produce an optical frequency comb using a resonator having normal, rather than anomalous, dispersion. System 300 may include a light source 302, a waveguide 304 to transmit light from light source 302, and a resonator 306. The elements of system 300 are merely exemplary, however. Although light source 302, waveguide 304, and resonator 306 are depicted as separate elements, they may be combined in any suitable combination. System 300 may also include additional or alternative structures. Light source 302 may include, for example, a laser light source. For example, light source 302 may include a cavity resonator. In examples, light source 302 may include a single cavity resonance. Alternatively, light source 302 may include alternative types of light sources. Waveguide 304 may transmit light generated by light source 302 and may have any suitable properties for transmitting the light.

Resonator 306 is depicted as a ring resonator but is not so limited. Resonator 306 may have any desired geometry.

Resonator 306 may include a modulation/periodic perturbation, such as a grating 410 (shown in the enlarged inset of FIG. 5), on an inner surface of resonator 306. For example, grating 410 may include a Bragg grating. Grating 410 may split the light received from light source 202 at a predetermined wavelength and to a precise extent. For example, grating 410 may diffract some of the light received from light source 302 in a backwards direction within resonator 306. For example, if light is passing in a counter-clockwise direction through resonator 306, some of the light will diffract off grating 410 and travel in a clockwise direction. Thus, resonator 306 having a Bragg grating may split a single input resonance into two resonances, both offset from a position of the input resonance would have in the absence of the Bragg grating. One of the split resonances produced using system 300 may be used as a resonance being pumped, to produce an optical frequency comb. Using one of the split resonances may have the same effect as using a resonance that is shifted, because she split resonance is itself shifted.

Resonator 306, with the Bragg grating formed therein/ thereon, may allow generation of an optical frequency comb at any wavelength of interest. Resonator 306 may include any suitable materials and be integrated into any suitable assembly. For example, an ultra low-loss silicon nitride may be used for resonator 306 and other elements of system 300 (or a larger system into which system 300 is incorporated). A low-loss platform may, due to higher quality factors, produce optical frequency combs for lower light source powers, and generated combs may have narrower linewidths.

Figure 5:
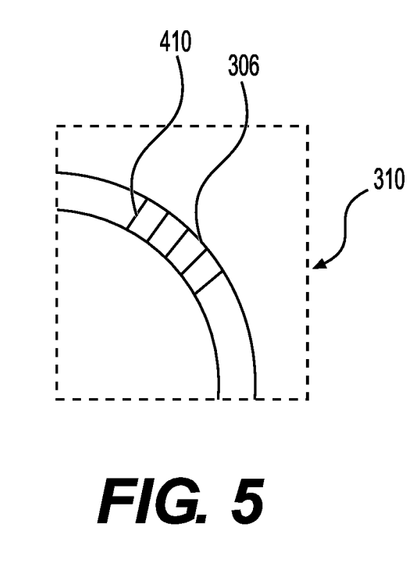
FIG. 5 depicts details of a resonator of the system of FIG. 4.

Waveguide 304 and/or resonator 306 may be produced through any suitable process, such as lithography, etching, and cladding deposition. As discussed above, design of resonator 306 may include a periodic modulation of sidewalls of the waveguide. For example, resonator 306 may include gratings 410, which, as discussed above, may be Gragg gratings. Gratings 410 may split a frequency that satisfies the Bragg condition. The Bragg condition is calculated according to the following equation: $\lambda = \lambda_0 / n_{eff}$, where $\lambda$ is the grating period, $\lambda_0$ is the free-space optical wavelength, and $n_{eff}$ is the effective refractive index.

Light from light source 302 may be injected into resonator 306 (e.g., via waveguide 304) at a wavelength corresponding to the split resonance (i.e., A in the above equation). As the frequency of light source 302 is scanned across the resonance frequency, the resonator's nonlinear coefficient may couple light from light source 302 across a span of wavelengths supported by the optical comb (i.e., via spontaneous four wave mixing). The span of the wavelengths may be determined by the dispersion of the waveguide, which relates to the effective refractive index of the waveguide move changes with respect to wavelength.

The systems 44, 300 described above may be utilized together. For example, system 300 may be utilized to generate one or more optical comb(s). System 44 may be used to filter the generated optical comb(s), as described above. Any of the features of system 44 may be combined with any of the features of system 300. Some features of system 44 and/or system 300 may be omitted, or additional features may be included.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for using optical frequency combs, the method comprising:
    applying a first filter to a first optical frequency comb, wherein the first filter selects a first frequency line of the first optical frequency comb;
    applying a second filter to a second optical frequency comb, wherein the second filter selects a second frequency line of the second optical frequency comb;
    altering the first filter and the second filter;
    applying the altered first filter to the first optical frequency comb, wherein the first filter selects a third frequency line of the first optical frequency comb, wherein the third frequency line differs from the first frequency line; and
    applying the altered second filter to the second optical frequency comb, wherein the second filter selects a fourth frequency line of the second optical frequency comb, wherein the fourth frequency line differs from the second frequency line.

2. The method of claim 1, wherein altering the first filter includes adjusting a first temperature of the first filter.

3. The method of claim 2, wherein adjusting the first temperature of the first filter includes heating the first filter.

4. The method of claim 2, wherein altering the second filter includes adjusting a second temperature of the second filter.

5. The method of claim 4, wherein adjusting the second temperature of the second filter includes heating the second filter.

6. The method of claim 4, wherein adjusting the first temperature of the first filter comprises heating the first filter with a first heater, and wherein adjusting the second temperature of the second filter comprises heating the second filter with a second heater.

7. The method of claim 6, wherein the first heater and the second heater comprise microheaters.

8. The method of claim 1, further comprising:
    before altering the first filter, generating a first radio frequency using the first frequency line of the first optical frequency comb and the second frequency line of the second optical frequency comb; and after altering the first filter and the second filter, generating a second radio frequency using the third frequency line of the first optical frequency comb and the fourth frequency line of the second optical frequency comb, wherein the second radio frequency is larger than the first radio frequency.

9. The method of claim 1, wherein the third frequency line is lower than the first frequency line, and wherein the fourth frequency line is higher than the second frequency line.

10. The method of claim 1, wherein the first filter includes a first pass-band and a second pass-band, and wherein each of the first pass-band of the first filter and the second pass-band of the first filter has a higher frequency before the first filter is altered.

11. The method of claim 10, wherein the second filter includes a third pass-band and a fourth pass-band, and wherein each of the third pass-band of the second filter and the fourth pass-band of the second filter has a lower frequency before the second filter is altered.

12. The method of claim 1, further comprising, before altering the first filter, generating a first radio frequency using the first frequency line of the first optical frequency comb and the second frequency line of the second optical frequency comb.

13. The method of claim 12, further comprising, after altering the first filter and the second filter, generating a second radio frequency using the third frequency line of the first optical frequency comb and the fourth frequency line of the second optical frequency comb.

14. The method of claim 1, wherein a free spectral range ("FSR") of the first filter is offset relative to a repetition rate of the first optical frequency comb.

15. The method of claim 14, wherein the FSR is offset relative to the repetition rate of the first optical frequency comb by greater than or equal to a full width at half maximum ("FWHM") of a first resonance of the first optical frequency comb.

16. The method of claim 14, wherein a second free spectral range ("second FSR") of the second filter is offset relative to a second repetition rate of the second optical frequency comb.

17. The method of claim 16, wherein the second FSR is offset relative to the second repetition rate of the second optical frequency comb by greater than or equal to a full width at half maximum ("FWHM") of a second resonance of the second optical frequency comb.

18. The method of claim 17, wherein the FSR of the first filter is less than the repetition rate of the first optical frequency comb, and wherein the second FSR of the second filter is greater than the second repetition rate of the second optical frequency comb.

19. The method of claim 1, wherein the first filter selecting the first frequency line of the first optical frequency comb comprises using a first resonator to select the first frequency line of the first optical frequency comb.

20. The method of claim 19, wherein the second filter selecting the second frequency line of the second optical frequency comb comprises using a second resonator to select the second frequency line of the second optical frequency comb.

* * * * *